United States Patent [19]
Kirkpatrick et al.

[11] 3,891,050
[45] June 24, 1975

[54] BORE HOLE INSTRUMENT PACKAGE SELF-LEVELER

[75] Inventors: Burnard M. Kirkpatrick, Dallas; James C. Moore, Rockwall, both of Tex.

[73] Assignee: Teledyne Industries, Inc., Dallas, Tex.

[22] Filed: Mar. 6, 1974

[21] Appl. No.: 448,627

[52] U.S. Cl. .................. 181/102; 33/308; 181/104; 308/DIG. 1
[51] Int. Cl. ........................................... G01d 11/02
[58] Field of Search ......... 308/DIG. 1; 33/308, 313; 181/102, 104

[56] References Cited
UNITED STATES PATENTS
2,972,193  2/1961  Young................................. 33/313

Primary Examiner—Maynard R. Wilbur
Assistant Examiner—S. C. Buczinski
Attorney, Agent, or Firm—Dowell & Dowell

[57] ABSTRACT

Apparatus for unlocking and leveling an instrument package good within a sealed bore hole tool after it is lowered into place, including pumping means for periodically inducting ambient gas from the tool housing and discharging it as an impulse into a gas bearing assembly located inside the housing and including a fixed bearing plate having a seat, a ball supported on the seat and in turn supporting the instrument pod, and spring-urged ball clamping means. Each impulse of gas momentarily retracts the clamping means and floats the ball above the seat on a thin film of the gas for the duration of the impulse to free the pod to align itself gravitationally.

11 Claims, 8 Drawing Figures

PATENTED JUN 24 1975  3,891,050

SHEET 1

BORE HOLE INSTRUMENT PACKAGE SELF-LEVELER

FIELD OF INVENTION

This invention relates to apparatus for supporting unlocking and leveling an instrument package intended to operate in an inaccessible location, and more particularly relates to apparatus for selectively leveling a seismic instrument pod mounted in a cylindrical housing lowered into a bore hole drilled in the Earth so as to establish accurate vertical alignment of the seismometer although the bore hole may be somewhat inclined off of vertical.

BACKGROUND - PRIOR ART

U.S. Pat. No. 1,738,589 (1929) to Koppl, and U.S. Pat. No. 2,449,674 (1948) to Schmidt are representative of prior art bore hole apparatus in which instruments are pendulously supported in a tool housing in such a way as to provide a degree of self-leveling after the bore hole tool reaches its operating level in the Earth. U.S. Pat. No. 1,738,589 includes means for clamping the instrument after it has been leveled, and U.S. Pat. No. 2,449,674 includes means for applying impact to the instrument after it has lodged at the desired operating level. However, these expedients are only adequate to accomplish a very crude degree of alignment as compared with the degree of alignment which the present invention achieves.

The instruments to be supported and aligned in this disclosure are seismometers whose periods have been extended and whose sensitivities have been increased by the use of external feedback electronics, thereby providing instruments of greatly improved mass-position stability wherein the actual movement of an instrument's suspended mass is very small. Since the total displacement of the seismometer mass is small, the alignment of the seismometer with respect to the local gravitational vector must be very close prior to placing the instrument in operation. In one practical system manufactured according to this disclosure three orthogonal seismometers are individually supported in separate pods within a well-bore tool housing, the seismometers having periods falling in the range of 100 seconds — 1 second, and the housing being designed to be useful in bore-holes whose inclinations may be as great as 5°. However, the instrument pod leveling apparatus must be capable of leveling the seismometers to within 0.1° and clamping them there so that, when clamped the seismometer pods faithfully follow any motions of the tool housing in the Earth.

THE INVENTION

The present apparatus provides a unitary suspending, locking and self-leveling means which is separate for each instrument pod housed in a particular bore-hole tool, each such means comprising a ball-and-socket tool, each such ball is attached to the pod at its upper joint in which the ball is attached to the pod at its upper surface and pendulously supports it in a stationary socket plate which is mounted on the tool housing. The plate includes upper and lower socket portions, the upper portion being fixed to said socket plate and the lower portion being spring-urged downwardly toward upper portion and normally applying a clamping force it from above and normally applying a clamping force to the ball. Air under pressure is pulsed into a plenum annulus between the upper and lower socket portions to momentarily raise the upper socket portion to release the clamping force and also to raise the ball off of the lower socket portion by providing a film of air therebetween so that until the pulse of air leaks out of the plenum the instrument pod is free to adjust its vertical alignment while supported on the film of air in an essentially frictionless manner. Short pulses of air are selectively delivered to the plenum annulus by a motor-driven pump which compresses the air or other gas already contained within the tool housing so that an unlimited number of attempts can be made to achieve excellent instrument leveling.

It is a principle object of this invention to provide self-leveling means for suspending a seismic instrument pod in an inaccessible location within a housing. The suspension having clamping means normally operative to clamp the suspension so that the pod faithfully follows motions of the housing within which it is contained, and the suspension further including means for selectively releasing the clamping means and supporting the suspended instrument pod on a gas film bearing thereby releasing the pod from frictional restraints and allowing it to align itself with the local gravity vector and be moved toward improved alignment by its own off-center weight before being clamped again. With plural alignment cycles as described above, the instrument pod asymptotically approaches perfect alignment until it is within satisfactory tolerance, which in the practical embodiment being manufactured is 0.1°.

Another major object of this invention is to provide ball-and-socket self-leveling suspension means of the gas-film bearing type in which the gas pressure serving to release the clamping means and raise the ball off of the seat in the socket is applied in discrete pulses during which the clamping means is unclamped, said pulses leaking off between their discrete applications. This pulsed application of the gas has advantages over the continuous application of gas, which advantages are important in the case of a sealed tool housing lowered into a bore hole in the Earth. In a sealed environment it is undesirable to increase the gas pressure in the housing, for instance by discharging a pressurized canister into it, because electric power is being dissipated in the housing and this dissipation causes convection turbulence which disturbs the instruments, which effect increases at higher ambient gas pressures. Moreover, an increase in gas pressure can not be vented into a water filled bore hole without creating noise that will disturb the instruments. A further advantage of the pulsed operation is that an impulse pump can be used to recompress the ambient gas already contained within the tool housing for each new impulse without adding more gas, and this can be done with greater economy of power than would be possible if a continuous flow of gas were required. In addition, the dithering effect of discrete pulsing results in closer final alignment, and the time between the intermittent impulses affords an opportunity to check the degree of alignment achieved by each prior impulse after the clamping means has again clamped the suspension. One important advantage in recompressing ambient gas for each impulse as compared with pulsing new gas into the housing from a canister is that the number of impulses that can be employed to achieve optimum alignment is virtually unlimited in the former case. Typically, the gas employed in a seismic well bore tool will be treated air, or perhaps some other more nearly inert gas.

Still a further object of this invention is to provide gas impulsing apparatus for use in a sealed well bore tool in which a small motor is geared to store energy in a spring by rotating a crank to which one end of the spring is attached until the crank passes top dead center, and then the spring suddenly rotates the crank toward bottom dead center, thereby delivering the spring-stored energy to a gas compressing piston located in a cylinder connected by duct means to the plenum annulus of the gas bearing.

Still another object of the invention is to provide a pendulous suspension construction having means for locking and unlocking the suspension of the pod within the housing so that the suspension can be locked prior to shipment to protect the seismic instrument and the suspension from damage, and then remotely unlocked after the housing has been lowered into the bore hole, and the motor which operates the locking means also being usable to make fine trimming alignments for centering the seismic masses relative to the supporting housing.

Other objects and advantages of the invention will become apparent during the following discussion of the drawings, wherein:

THE DRAWINGS

DESCRIPTION OF PREFERRED EMBODIMENT

Figure 1:
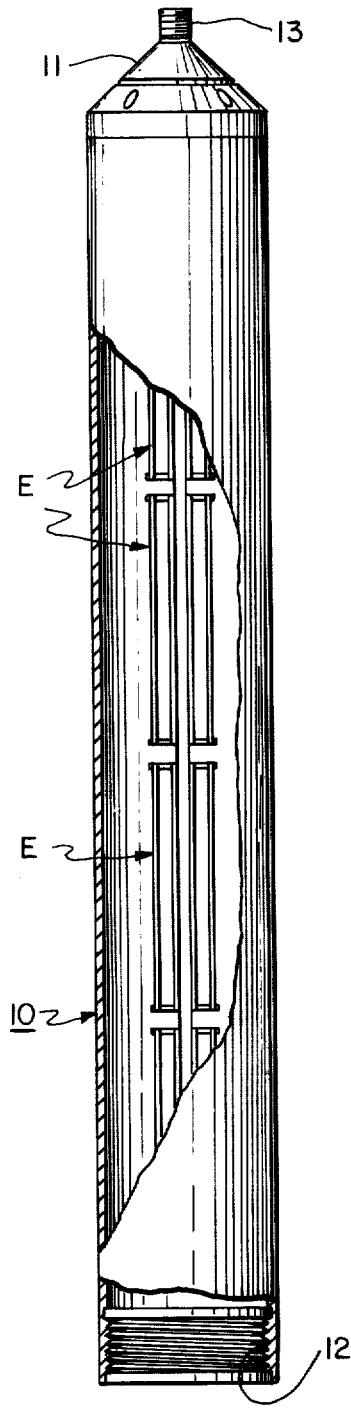
FIG. 1 and FIG. 2 show, respectively, upper and lower portions of a well bore tool in which the upper portion contains electronic modules and is screwed into the top of a lower portion which contains three orthogonally disposed seismometers each suspended on a gas bearing of the type which is the subject of the present invention.
Figure 2:
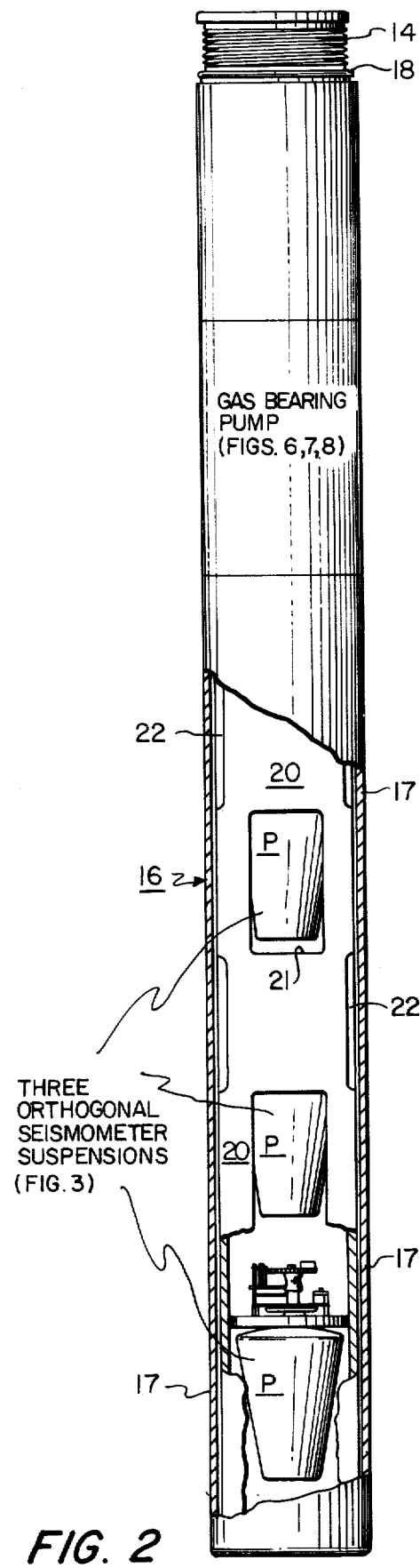

Referring now to FIGS. 1 and 2 which show upper and lower tool portions that screw together to form a complete seismic tool, the upper portion 10 of the tool is threaded internally at its lower end 12 and engages the threads 14 at the upper end of the lower tool portion 16 to form a joint sealed by an O-ring 18. The upper portion 10 has a conical top 11, with a threaded coupling 13 adapted to connect to the lower end of a cable (not shown) by which the tool is suspended and electrically connected to the surface. The tool as manufactured is five inches in diameter and about seven feet long. The upper portion 10 contains the electrical circuitry E required to implement the functions of the instruments in the instrument packages contained in the lower portion 16 of the tool, these instrument packages taking the form of seismometer pods P in the present illustrative embodiment.

Figure 3:
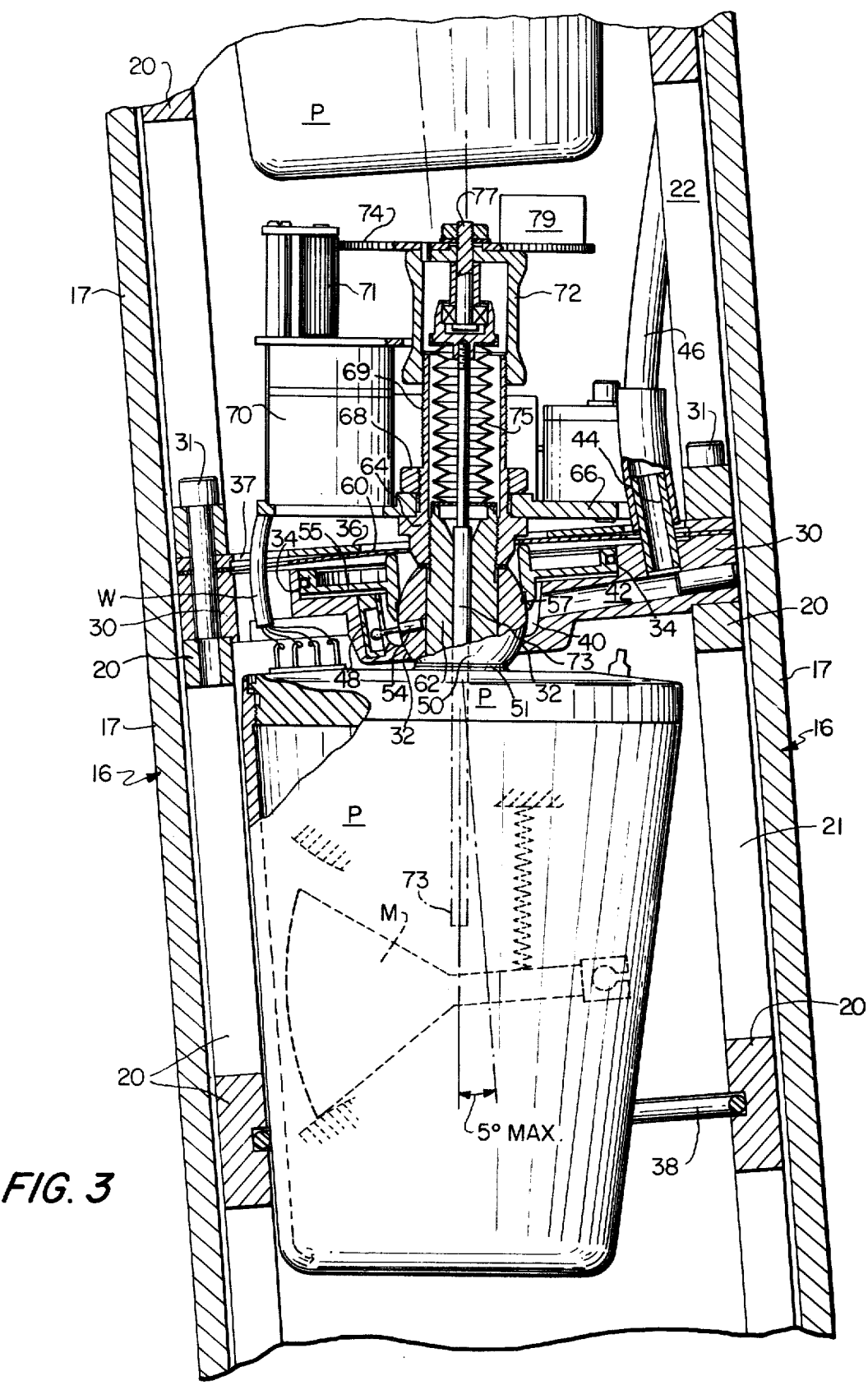
FIG. 3 is a detailed cross sectional view showing a gas bearing assembly supporting an instrument package pod containing a seismometer and including mechanism for trimming the zero-balance of the seismometer.

FIG. 3 shows a cross-sectional view of the lower tool portion 16 in the vicinity of a seismometer pod P which is suspended on a gas bearing. FIGS. 2 and 3 show that the lower tool portion 16 comprises an outer pressure casing 17 in which an inner housing 20 has been removably installed. The housing has a number of openings 21 and 22 through its walls as can be seen most clearly in FIG. 2.

Figure 4:
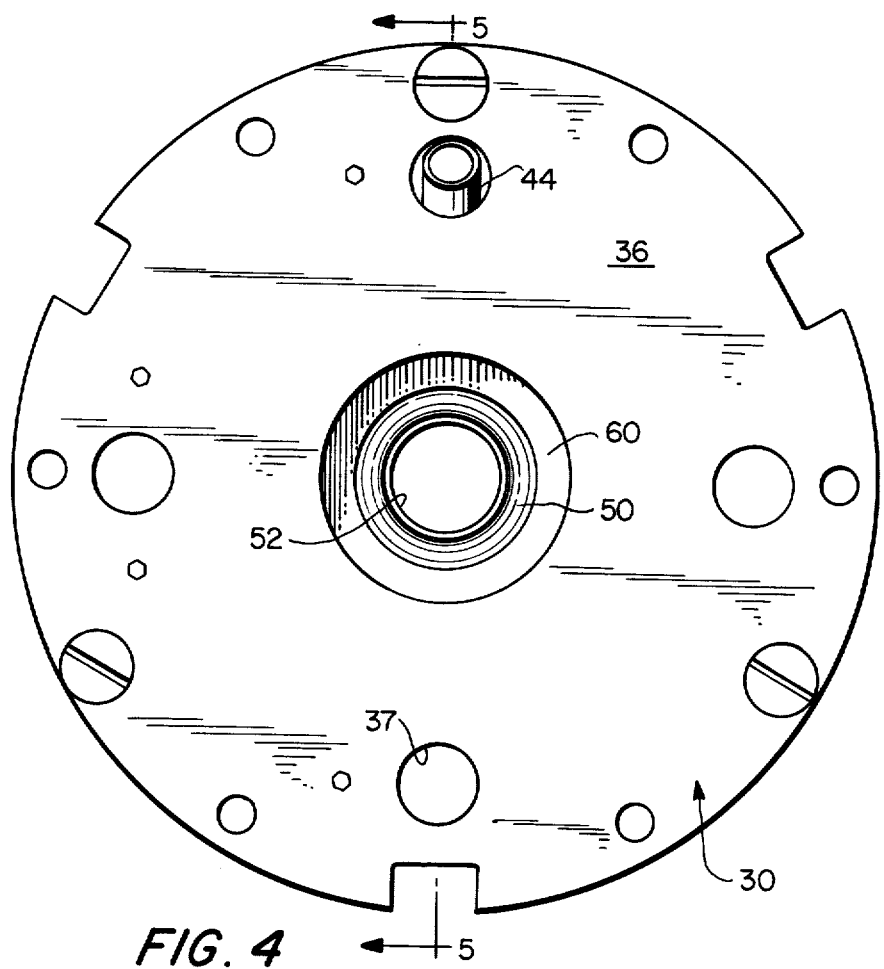
FIG. 4 is a plan view of the gas-bearing stationary plate shown in the assembly of FIG. 3.
Figure 5:
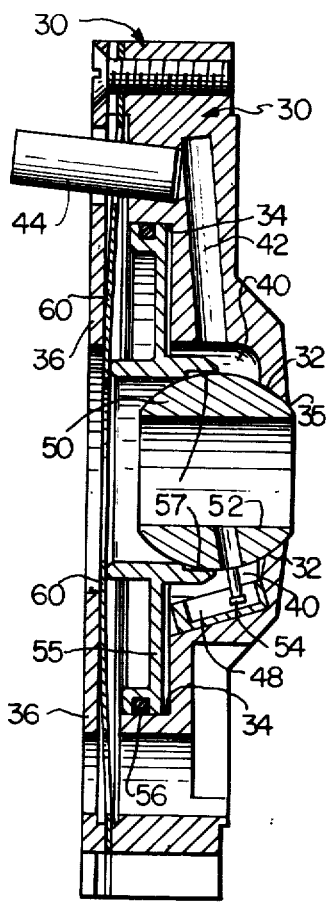
FIG. 5 is a sectional view taken along line 5—5 of FIG. 4.

A bearing plate 30, FIGS. 3, 4, and 5, is bolted by screws 31 to the housing 20 and lies normal to the axis of the cylindrical tool. The bearing plate is machined to have a ball support seat 32 comprising a segment of a sphere with a central hole 35 through which a ball 50 can be attached as at 51 to the top of the instrument pod P, FIG. 3. The bearing plate 30 has a cylindrical bore 34 in its upper surface in which a clamping member 55 is reciprocably placed, an O-ring 56 sealing the fit. The clamping member 55 also has a seat 57 which normally lies on the ball 50, and the clamping member 55 is strongly urged downwardly in the bore 34 by a spring member 60. The ball 50 has a bore 52 through its center for a purpose hereinafter discussed. The gas bearing thus described has a gas plenum 40 located within the plate 30, around the ball 50 and between the seats 32 and 57. This plenum 40 is coupled by a passageway 42 with a gas inlet tube 44 which is connected by a hose to tubing 46 and to a gas pump, FIGS. 6 and 7, to be discussed hereinafter. The ball 50 also carries an outwardly extending locating pin 54 whose outer end rides in a slotted guide 48 carried in the side of the plenum 40, whereby the ball is restrained from rotating in the seat plate 30. When the plenum 40 is pressurized through the passageway 42, the pressure of the gas raises the clamping member 55 in the bore 34 against the downward force of the disc spring 60 and releases the downward force on the spherical ball 50. Since the lower seat 32 comprises a segment of a sphere lying below the center of the latter, the ball 50 will rise off of the seat 32 and be suspended on a film of gas until the gas pressure is spent. Then the ball will settle back upon the seat 32 and the clamping member will descend again onto the ball and clamp it tightly in the plate 30 so that the instrument pod P, which it supports, will faithfully follow motions of the tool case 17 and housing 20. The top of the plate assembly 30 is covered by a cover plate 36 which holds the spring 60 in place, and this plate 36 has a hole 37 in it through which wiring W from the instrument pod P passes on its way to the electronics E in the upper tool portion 10.

The upper surface of the pod P has a mounting stem 62 fixed to it and extending upwardly through the bore 52 in the ball 50, and this stem is held in place by a bushing 64 screwed onto its upper end. The bushing 64 in turn carries a mounting plate 66 secured near its lower end by a nut 68 screwed down upon an upper externally threaded extension in the form of a tube 69. The plate 66 supports several components which need not be discussed herein, but which include a small motor 70 carrying a long-gear-toothed spur 71. A sleeve 72 is internally threaded to engage the external threads on the extension tube 69, and a gear wheel 74 is keyed to the upper end of the sleeve 72. Thus, when the motor 70 rotates the spur 71, it turns the engaging gear wheel 74 and runs the sleeve 72 up or down on the threaded extension tube 69, which is a part of the bushing 64. A control rod 73 passes through the stem 62 and the ball 50 and into the pod P where it operates means for locking and unlocking the suspended mass M of the seismometer itself which is shown only very schematically in FIG. 3 in dashed lines, the rod 73 when driven downwardly locking the mass M by locking means (not shown) which in one manufactured embodiment operates to insert locking pins into the mass near its center of gravity. The rod 73 passes through a bellows seal 75 and has its upper end secured by a member 77 to the gear wheel 74. An eccentric weight 79 is placed on the gear wheel 74 and can be left in any desired angular location so that the center of gravity of the pod assembly which is supported by the ball 50 can be selectively shifted slightly to trim the vertical alignment of the seismometer pod P to allow the feedback current which centers the seismic mass relative to its supporting frame to be minimized, the vertical alignment being especially critical for the horizontally oriented seismometer. An O-ring 38 carried by a groove in the housing 20 acts as a bumper to cushion the pod P against shock during transportation of the tool and lowering thereof into the well bore. The seismometer instruments and their transducers that are contained within the pods P are not described herein.

As related above, the source of supply of gas under pressure presented a problem, since it was important to be able to pulse the gas bearings as often as required to level the pods P, but to do so without raising the ambient pressure in the tool. These goals were achieved by using a pump which inducts the ambient gas, mostly conditioned air, within the tool and pulses it intermittently to the gas bearing tubing 46.

Figure 8:
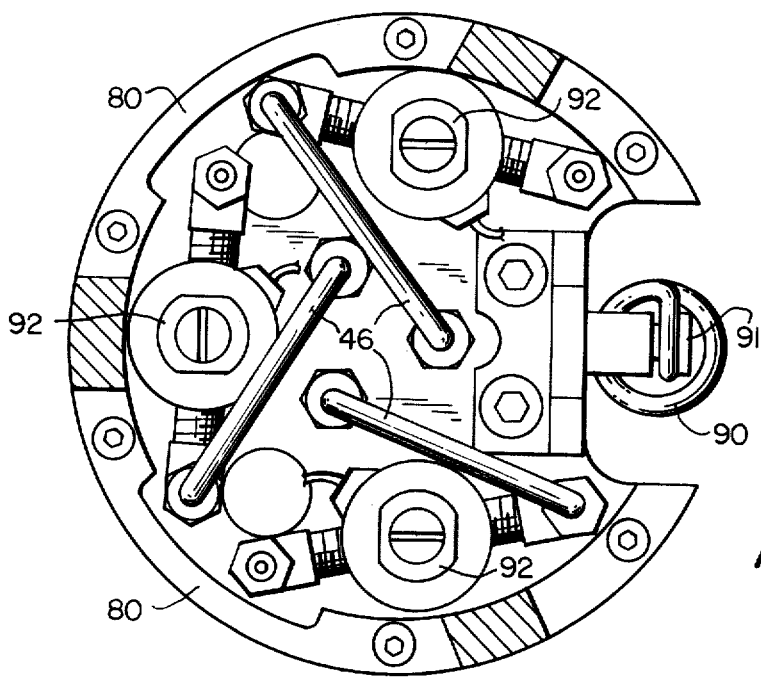
FIG. 8 is an enlarged sectional view taken along line 8—8 of FIG. 6.
Figure 6:
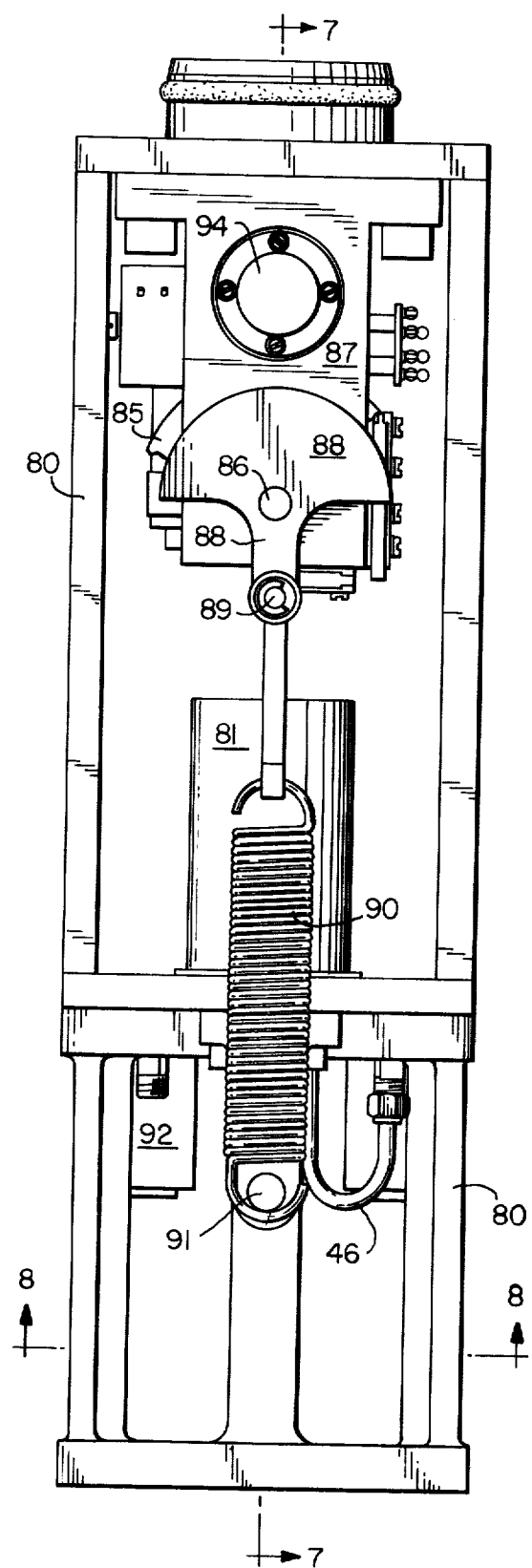
FIG. 6 is an elevation view of a pump for inducting ambient gas in the tool and delivering it under pressure to the gas bearing assembly of FIG. 3.
Figure 7:
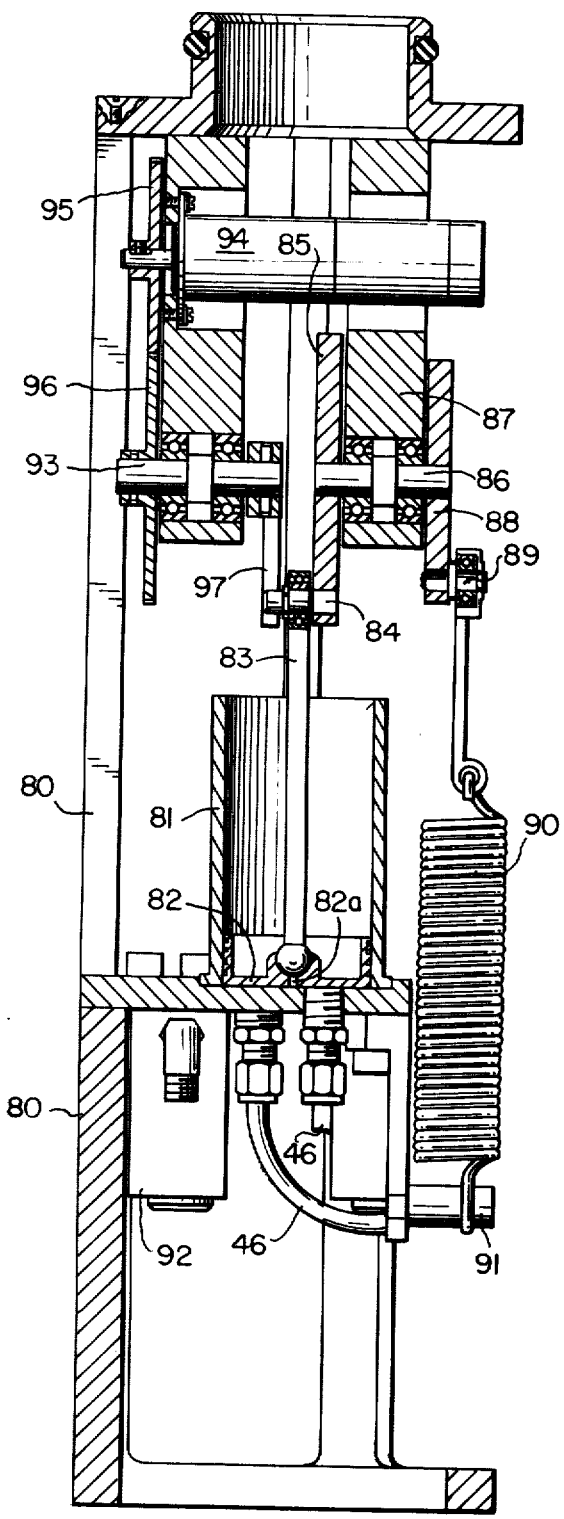
FIG. 7 is a sectional view taken along line 7—7 of FIG. 6.

FIGS. 6, 7, and 8 show the pump means as a modular assembly that fits inside the tool casing 16 and includes its own frame generally referred to by the reference numeral 80. Within the frame there is located a pump cylinder 81 having a pumping member in the form of a piston 82 reciprocable therewithin and carrying a piston rod 83 having its outer end journaled on a crank pin 84. The crank pin is supported on a disc 85 mounted on a crank shaft 86 fixed in bearings to the frame member 87. The other end of the crank shaft 86 supports a counterbalanced crank arm 88 having a pin 89 in its outer end connected by a link to one end of a strong tension spring 90. The other end of the spring is fixed to the frame by an anchor pin 91. Thus, if the crank shaft 86 is rotated, the spring 90 will be stretched until the crank arm 88 reaches top-dead-center with the piston 82 retracted away from the cylinder head. Then as the rotation passes top-dead-center, the spring 90 will suddenly rotate the crank around and drive the piston in a direction to compress the gas inducted into the cylinder 81 as the piston was retracted through an inlet check valve 82a in the pistonhead, FIG. 7. Of course, it requires lost motion drive means to rotate the crank arm 88 halfway around and then release it when the piston 82 is retracted so that the spring 90 can drive the piston suddenly back into the cylinder. This lost motion is furnished by the pump drive means which comprises a shaft 93 aligned with the crankshaft 86 but spaced therefrom. A motor 94 rotates the shaft 93 through gears 95 and 96 whenever the motor is energized. The end of the shaft 93 opposite the gear 96 carries a crank arm 97 pinned to it and located such that the end of the arm 97 interferes with the end of the crank pin 84 whenever the motor 94 is turning the shafts 93 and 86 in a direction to tension the spring 90. However, as the crank pins 84 and 89 pass through top-dead-center, the pin 84 advances ahead of the arm 97, and the spring 90 is then free to drive the piston 82 suddenly into the cylinder 81 and supply pulses of compressed gas through the tubes 46 into whatever gas bearings may be selected by means of solenoid valves 92 as shown in FIG. 8. As long as electric power is supplied to the motor 94 through control means (not shown), the pump will periodically pulse the gas bearings and momentarily free the ball-and-socket supports to permit the pods P to align themselves progressively more closely with the gravity vector in the well bore in which the tool is located, and no increase in the ambient gas pressure will result from repeated attempts at alignment of the instrument packages.

This invention is not to be limited to the exact embodiment shown in the drawings, for obviously changes may be made therein within the scope of the accompanying claims.

We claim:

1. Apparatus for supporting and leveling an instrument package within a housing adapted to be lowered into a bore-hole, comprising:

a. a controllable source of gas under pressure; and b. gas bearing means including a first bearing member fixed within the housing and a second bearing member attached to said instrument package and supporting the latter pendulously within the housing, and the bearing means including a gas plenum coupled to said source and operatively located with respect to said first and second bearing members to provide, when pressurized, a film of gas therebetween.

2. Apparatus as set forth in claim 1, wherein said instrument package comprises an elongated pod loosely fitting within said housing, and the pod having an upper end attached to said second bearing member so that it hangs beneath it in the housing.

3. Apparatus as set forth in claim 1, wherein said gas bearing means is a ball-and-seat assembly, said first bearing means comprising a bearing plate fixed horizontally in said housing and including said first bearing member in the form of a ball support seat comprising a segment of a sphere located below the spherical center and having a hole through the seat, and said second bearing member taking the form of a ball in the seat and attached to the instrument package through said hole.

4. Apparatus as set forth in claim 3, wherein said bearing plate supports a clamping member comprising a segment of the same sphere located above the spherical center, the clamping member being vertically reciprocable above said ball support seat and sealed to the plate, and said gas plenum being located between said spherical segments, and spring means urging the clamping member against said ball to clamp the ball against said support seat in the absence of gas under pressure.

5. Apparatus as set forth in claim 3, wherein said ball has a locating pin extending transversely therefrom, and said bearing plate has a slotted guide fixed thereto and receiving the end of the locating pin which extends from the ball to prevent rotation of the instrument package relative to the housing.

6. Apparatus as set forth in claim 3, wherein said instrument package contains moving-mass seismometer means including means to lock the mass against damage during transport, and said lock means being coupled to a reciprocable rod extending upwardly through the center of said ball to a location outside the package; a mounting plate secured to the top of the ball with said rod extending upwardly therethrough; and drive means carried by said mounting plate and coupled to control the position of said rod.

7. Apparatus as set forth in claim 6, wherein said package comprises an hermetically sealed pod, and seal means sealing the passage of the pod through the ball.

8. Apparatus as set forth in claim 6, wherein said drive means comprises a motor and drive gearing, and a weight moved by said gearing about the axis of said rod to shift the center of gravity of the pendulous instrument package.

9. Apparatus as set forth in claim 1, wherein said controllable source of gas under pressure comprises a pump for inducting ambient gas within the housing and delivering the inducted gas under pressure to the plenum, and a motor coupled to drive the pump.

10. Apparatus as set forth in claim 9, wherein said pump includes a gas pumping member urged by the force of a spring to drive the pumping member in a direction to discharge inducted gas into the plenum as an impulse, and intermittent drive means coupling the motor to retract the pumping member against the spring force and then release it.

11. Apparatus as set forth in claim 10, wherein said gas bearing means is a ball-and-seat assembly, said first bearing means comprising a bearing plate fixed horizontally in said housing and including said first bearing member in the form of a ball support seat comprising a segment of a sphere located and spaced below the spherical center; a ball comprising said second bearing member in said seat; and a clamping member comprising a segment of the same sphere located above the spherical center, the clamping member being vertically reciprocable above said ball support seat and sealed to the plate, and said gas plenum being located between said spherical segments; and spring means urging the clamping member against said ball.

* * * * *